(12) United States Patent
Xu et al.

(10) Patent No.: US 9,848,323 B2
(45) Date of Patent: Dec. 19, 2017

(54) METHOD FOR RESOLVING SECURITY ISSUES USING NH AND NCC PAIRS IN MOBILE COMMUNICATION SYSTEM

(71) Applicant: Samsung Electronics Co., Ltd, Gyeonggi-do (KR)

(72) Inventors: Lixiang Xu, Beijing (CN); Xiaowan Ke, Beijing (CN); Hong Wang, Beijing (CN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 86 days.

(21) Appl. No.: 14/907,531

(22) PCT Filed: Jul. 25, 2014

(86) PCT No.: PCT/KR2014/006789
§ 371 (c)(1),
(2) Date: Jan. 25, 2016

(87) PCT Pub. No.: WO2015/012631
PCT Pub. Date: Jan. 29, 2015

(65) Prior Publication Data
US 2016/0165438 A1    Jun. 9, 2016

(30) Foreign Application Priority Data
Jul. 25, 2013  (CN) .......................... 2013 1 0316310

(51) Int. Cl.
*H04L 9/08* (2006.01)
*H04W 12/04* (2009.01)
(Continued)

(52) U.S. Cl.
CPC ....... *H04W 12/04* (2013.01); *G06F 2201/875* (2013.01); *H04L 63/205* (2013.01);
(Continued)

(58) Field of Classification Search
CPC ............. H04W 12/04; H04W 36/0005; H04W 36/0038; H04W 84/045; H04W 72/042; H04L 63/205; H04L 9/08; G06F 2201/875
See application file for complete search history.

(56) References Cited

U.S. PATENT DOCUMENTS 8,457,638 B2    6/2013   Iwamura et al.
2011/0274276 A1*  11/2011  Xu .......................... H04W 12/04
                                               380/272
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)," 3GPP TS 36.300, V11.5.0, Mar. 2013, 209 pages.
(Continued)

*Primary Examiner* — Jayesh Jhaveri

(57) ABSTRACT

This application discloses a method of using NH and NCC pairs to resolve security issues. It includes: an MME sends a sequence including multiple NH and NCC pairs to S1GW that is calculated to correspond to a UE. After the S1GW receives a UE handover message or a UE bearer switch message from a base station, the S1GW may choose a next unused NH and NCC pair from the sequence sent by the MME and send it to a target base station. In using this application, part of the bearer switch of the UE or the switch of the UE can be terminated at the S1GW or HeNB GW, which reduces impact on the core network and cuts down on the use of system resources.

20 Claims, 12 Drawing Sheets

(51) Int. Cl.
*H04W 72/04* (2009.01)
*H04W 36/00* (2009.01)
*H04W 84/04* (2009.01)
*H04L 29/06* (2006.01)

(52) U.S. Cl.
CPC .... *H04W 36/0005* (2013.01); *H04W 36/0038* (2013.01); *H04W 72/042* (2013.01); *H04W 84/045* (2013.01)

(56) References Cited

U.S. PATENT DOCUMENTS

| | | | |
|---|---|---|---|
| 2012/0163336 A1 | 6/2012 | Adjakple et al. | |
| 2013/0070731 A1 | 3/2013 | Lim et al. | |
| 2013/0128866 A1* | 5/2013 | Zhang | H04W 12/06 370/331 |
| 2013/0155903 A1* | 6/2013 | Bi | H04B 7/024 370/255 |
| 2013/0288642 A1* | 10/2013 | Yang | H04W 36/0038 455/410 |
| 2013/0294405 A1* | 11/2013 | Radulescu | H04W 36/34 370/331 |
| 2013/0301611 A1* | 11/2013 | Baghel | H04W 72/04 370/331 |
| 2014/0051442 A1* | 2/2014 | Yang | H04W 36/12 455/436 |
| 2015/0094025 A1* | 4/2015 | Chen | H04W 12/04 455/411 |
| 2015/0269028 A1* | 9/2015 | Horn | H04W 12/04 714/4.1 |
| 2016/0057663 A1* | 2/2016 | Teyeb | H04W 36/0027 455/436 |
| 2016/0157095 A1* | 6/2016 | Zhang | H04W 52/0209 380/273 |
| 2016/0285716 A1* | 9/2016 | Pelletier | H04L 5/0098 |

OTHER PUBLICATIONS

Foreign Communication From a Related Counterpart Application, European Application No. 14829152.9-1870, Extended European Search dated Mar. 6, 2017, 7 pages.
International Search Report dated Oct. 29, 2014 in connection with International Patent Application No. PCT/KR2014/006789, 4 pages.
Written Opinion of the International Searching Authority dated Oct. 29 2014 in connection with International Patent Application No. PCT/KR2014/006789, 4 pages.

\* cited by examiner

[Fig. 1]
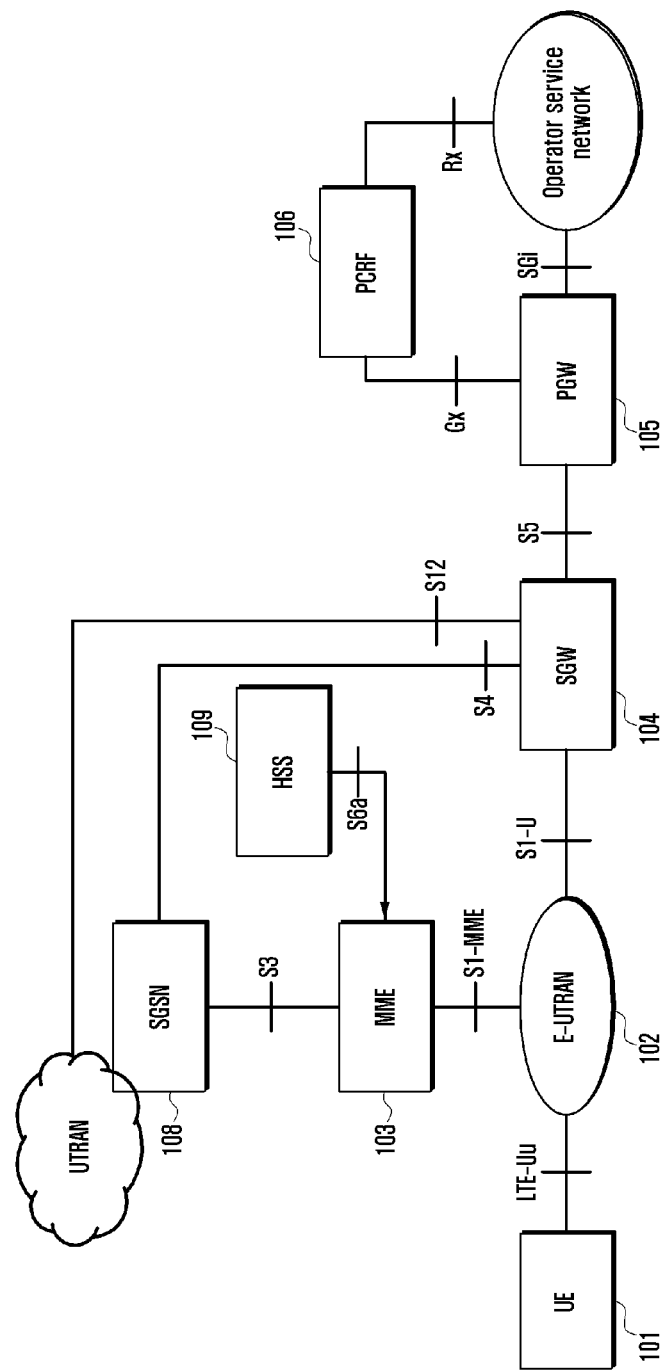

[Fig. 2]
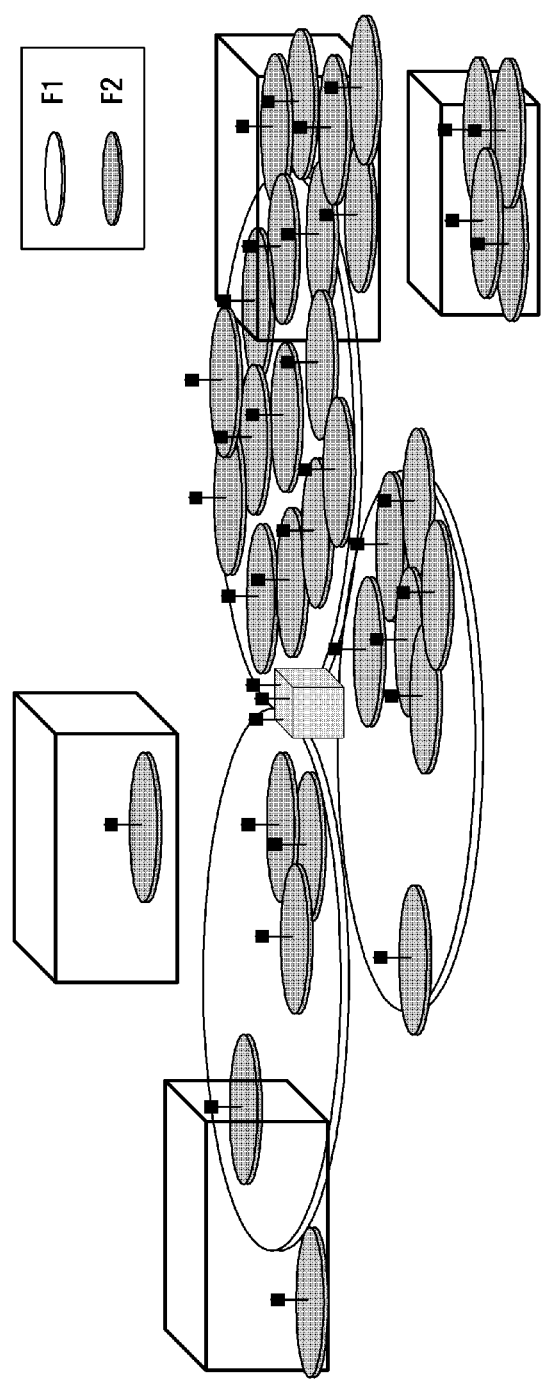

[Fig. 3]
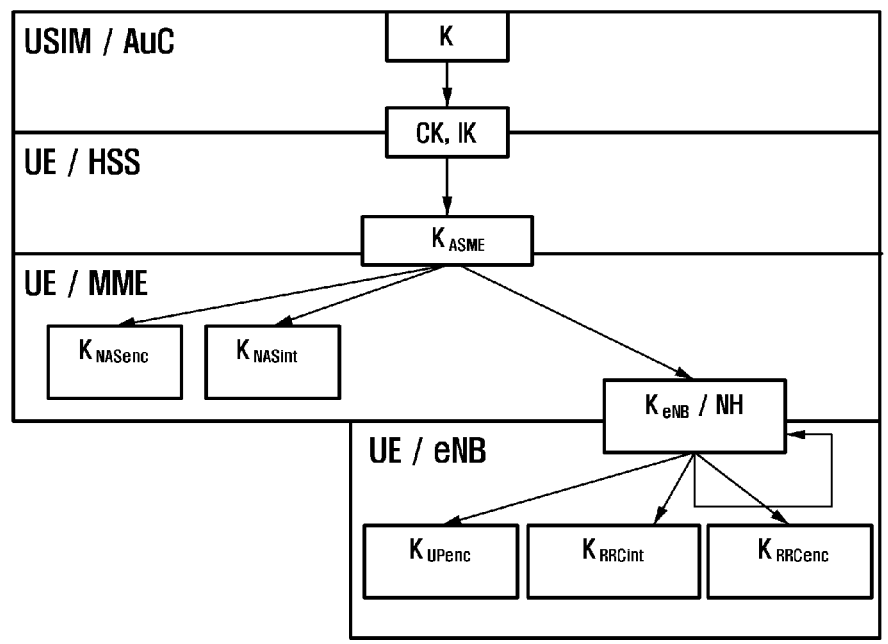

[Fig. 4]
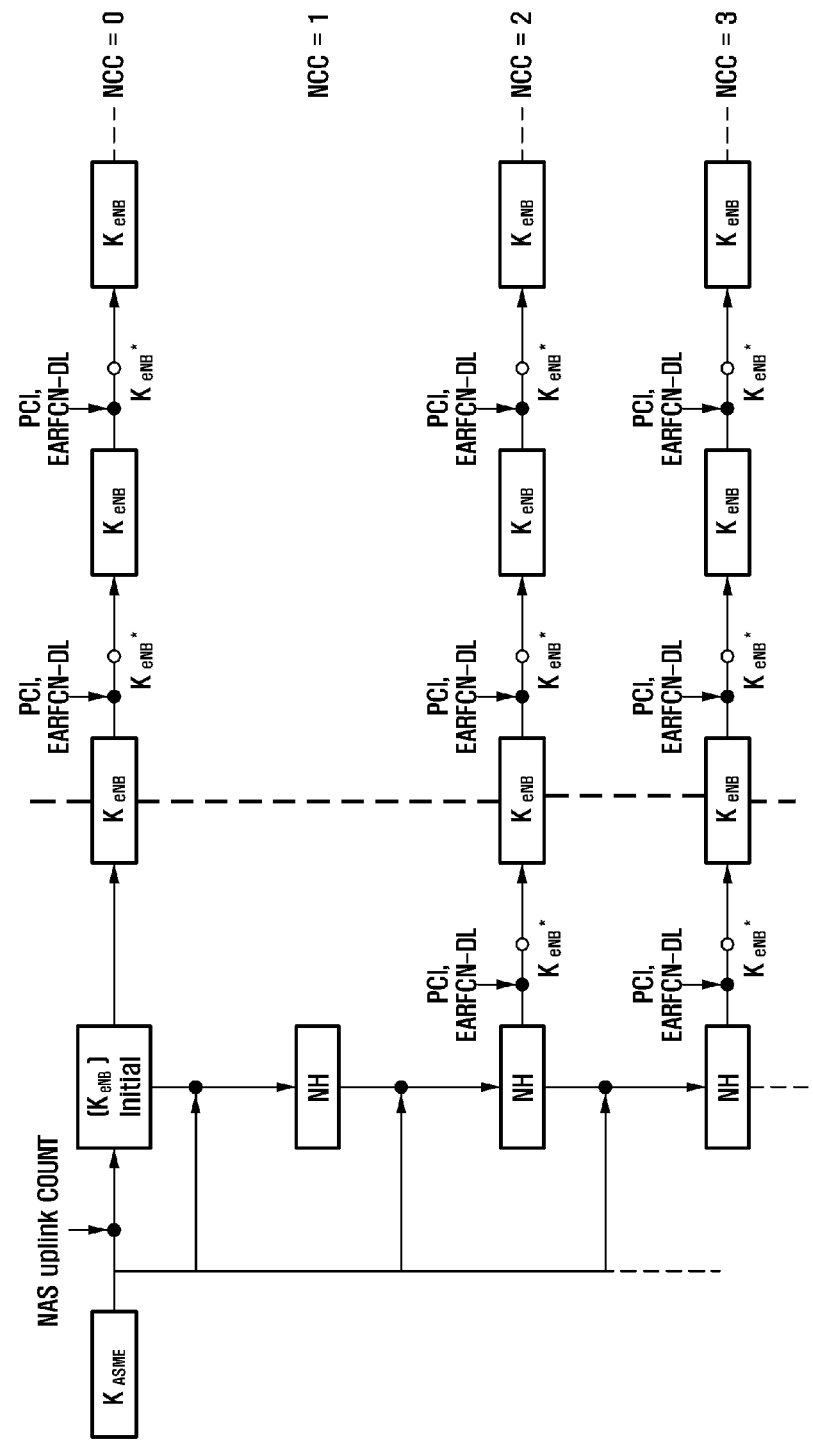

[Fig. 5]
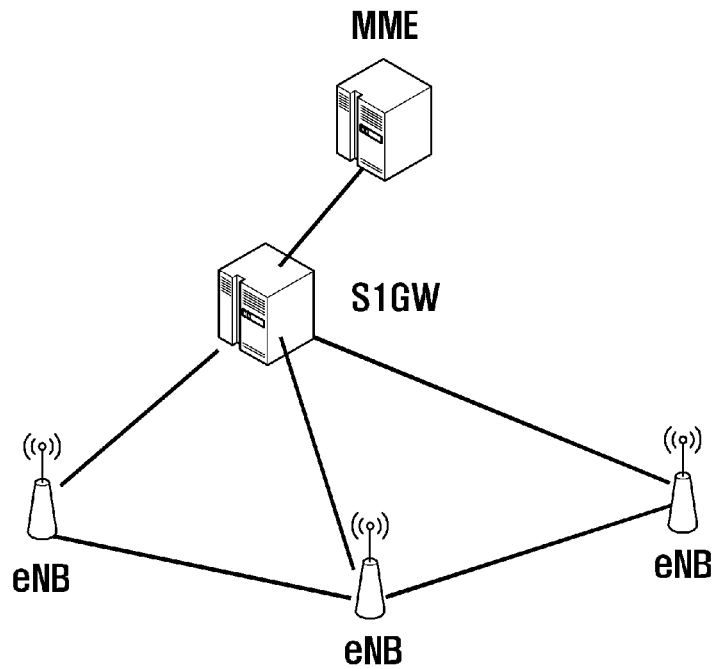
[Fig. 6]
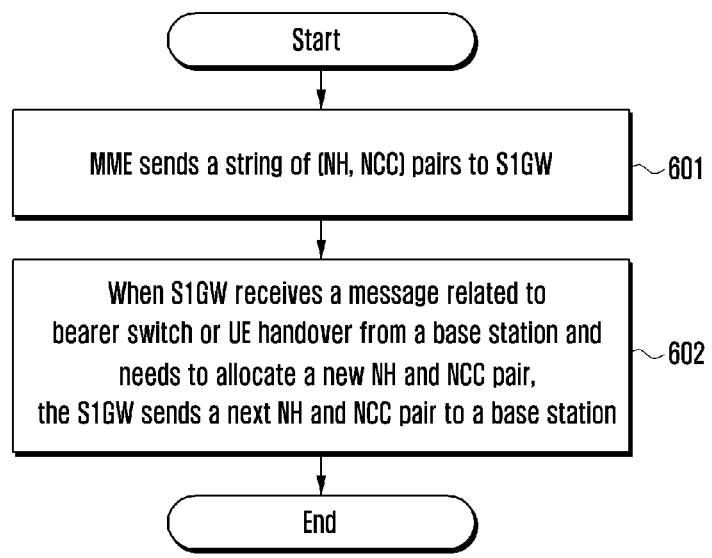

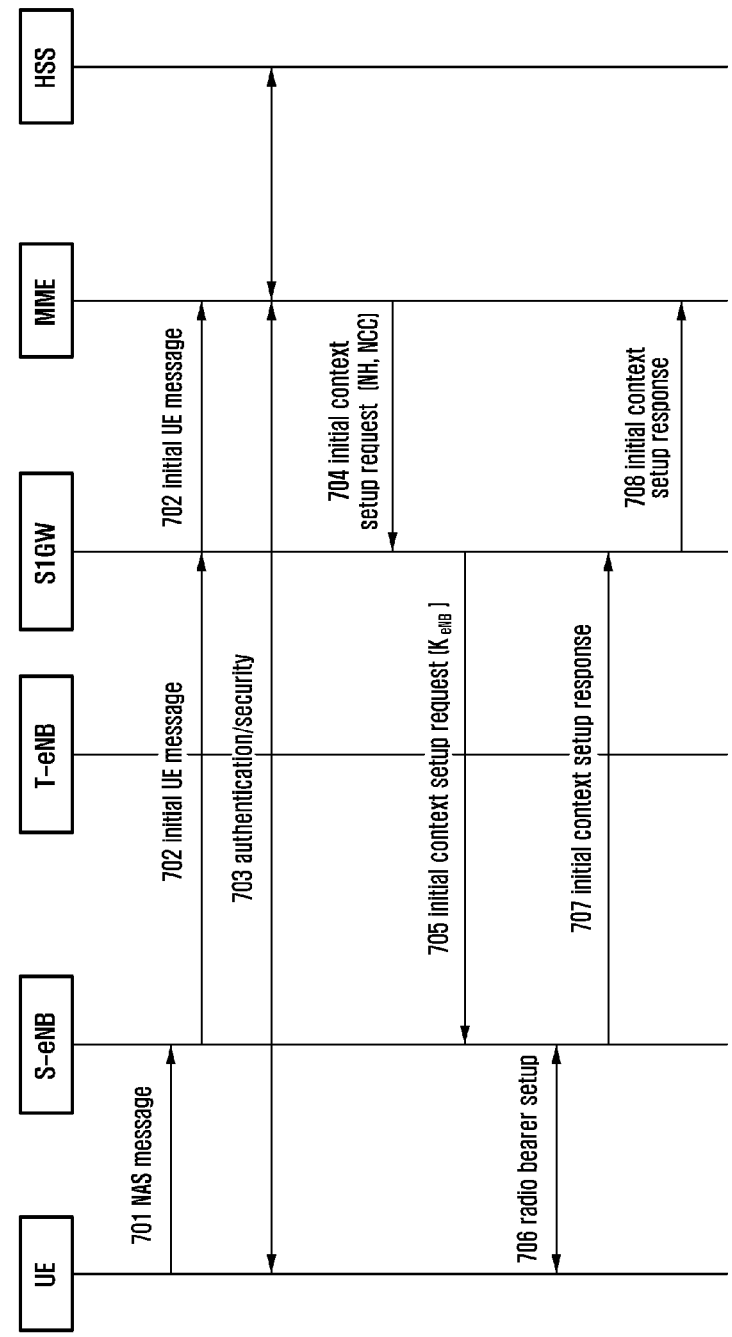
[Fig. 7]

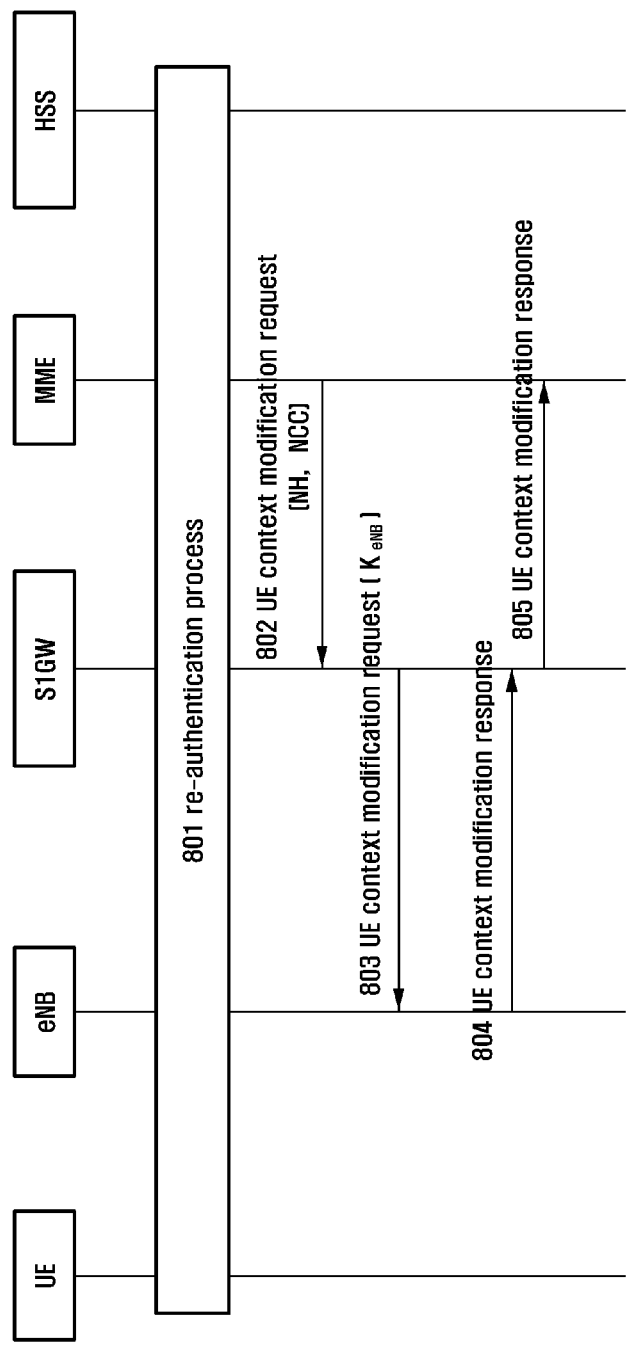
[Fig. 8]

[Fig. 9]
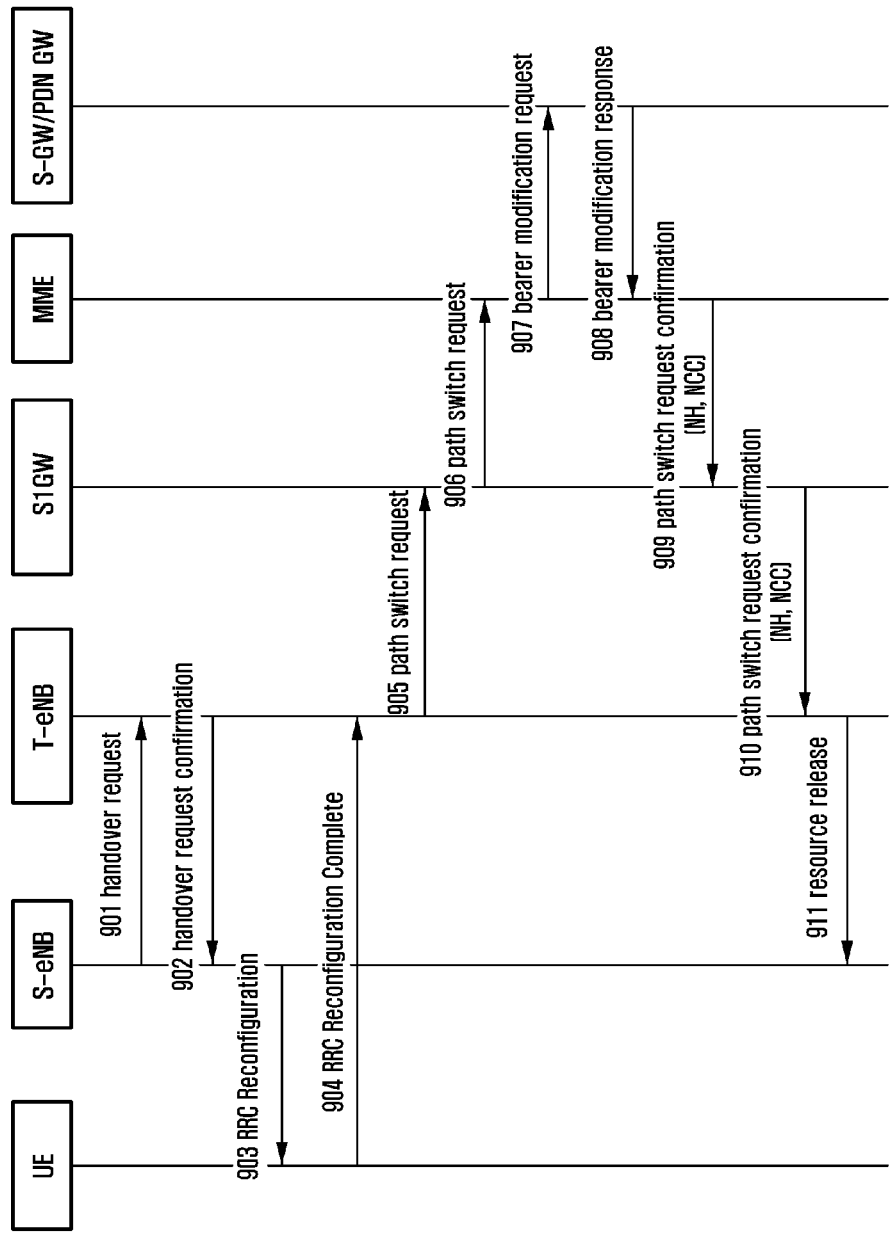

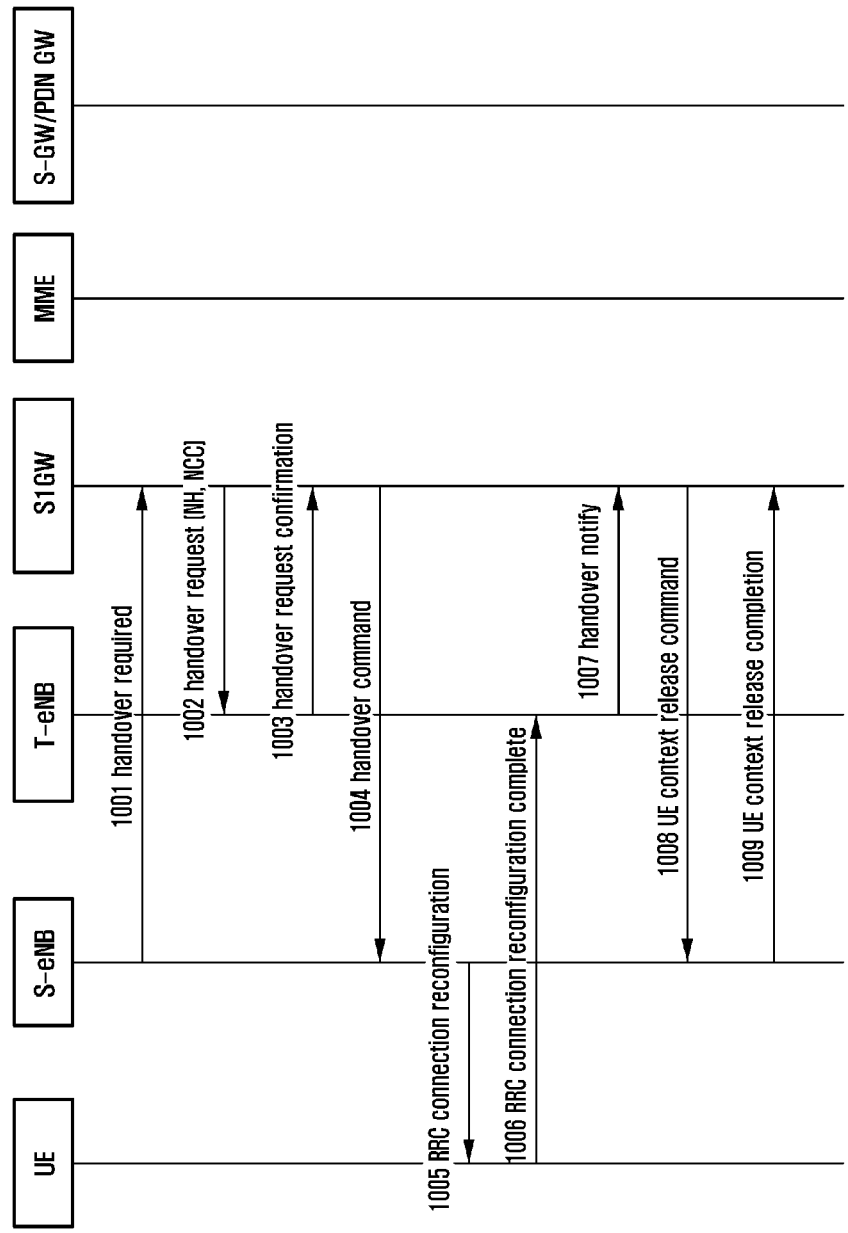
[Fig. 10]

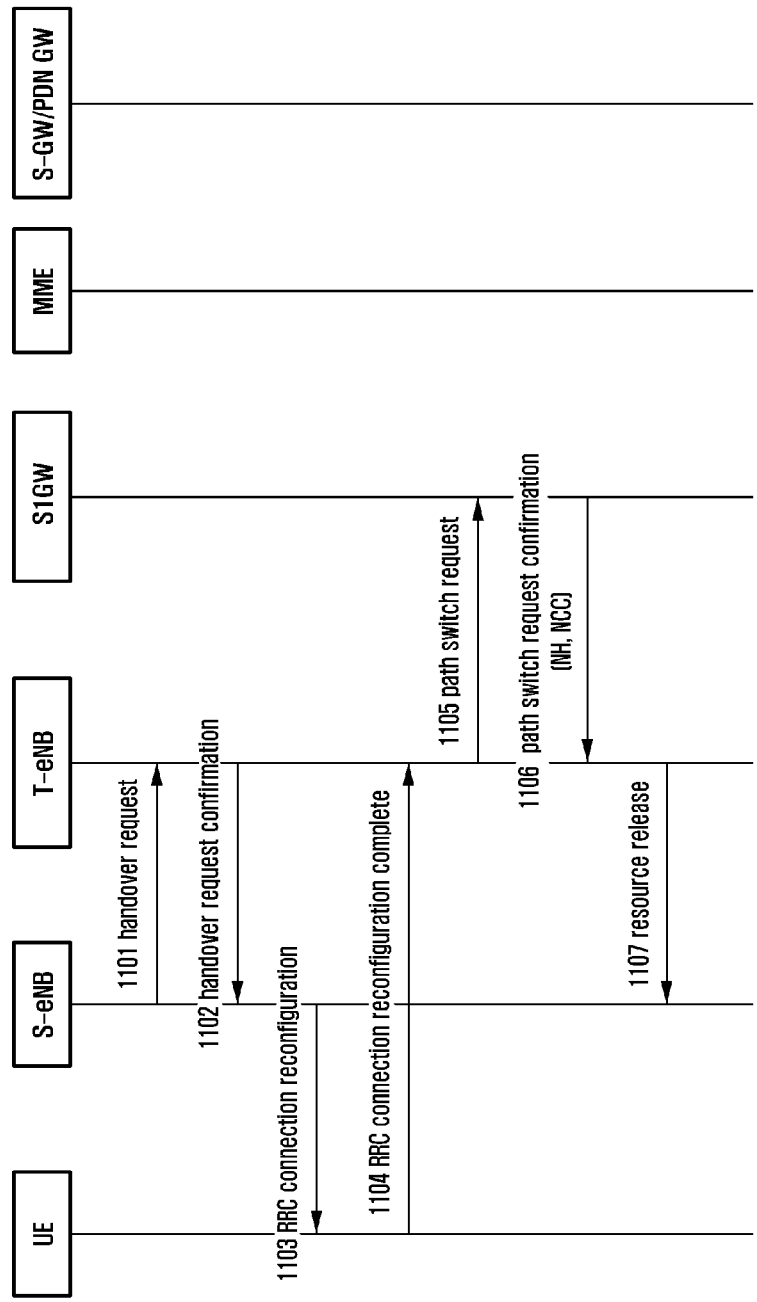
[Fig. 11]

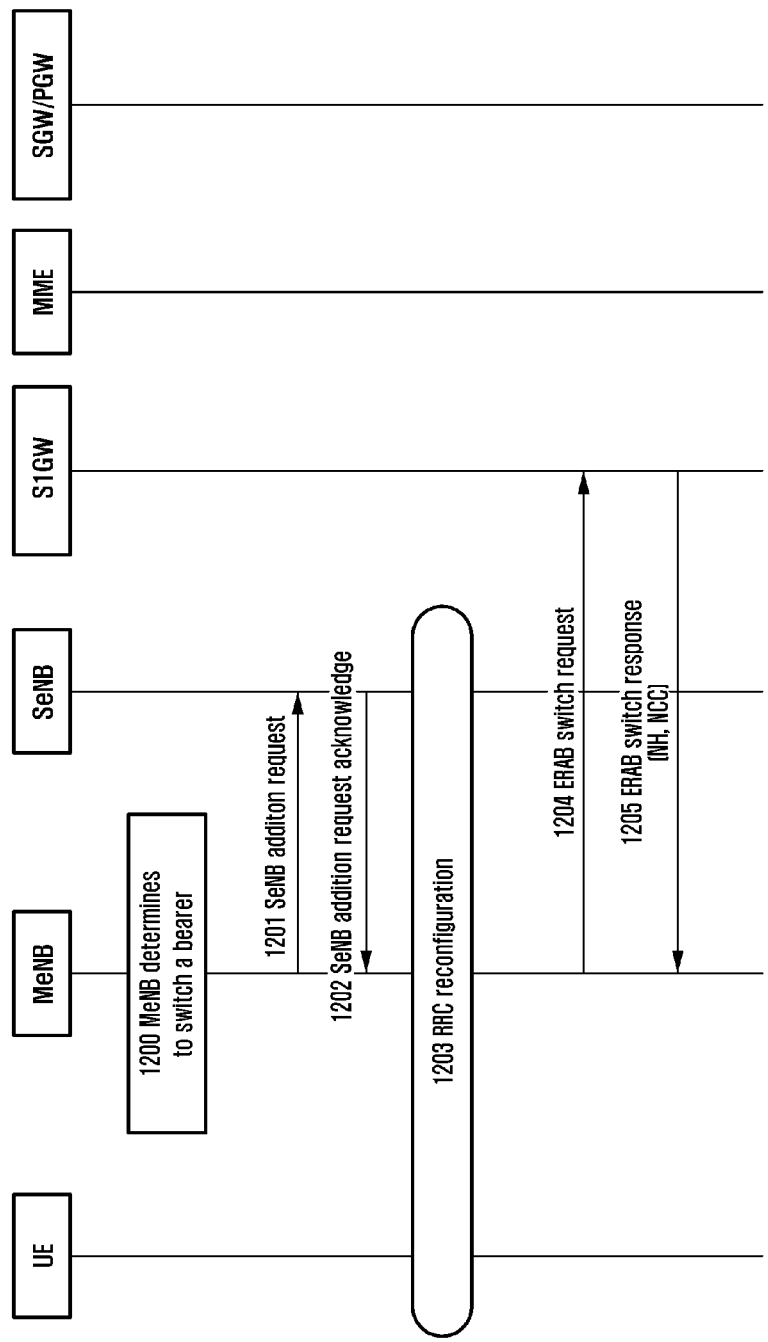
[Fig. 12]

[Fig. 13]
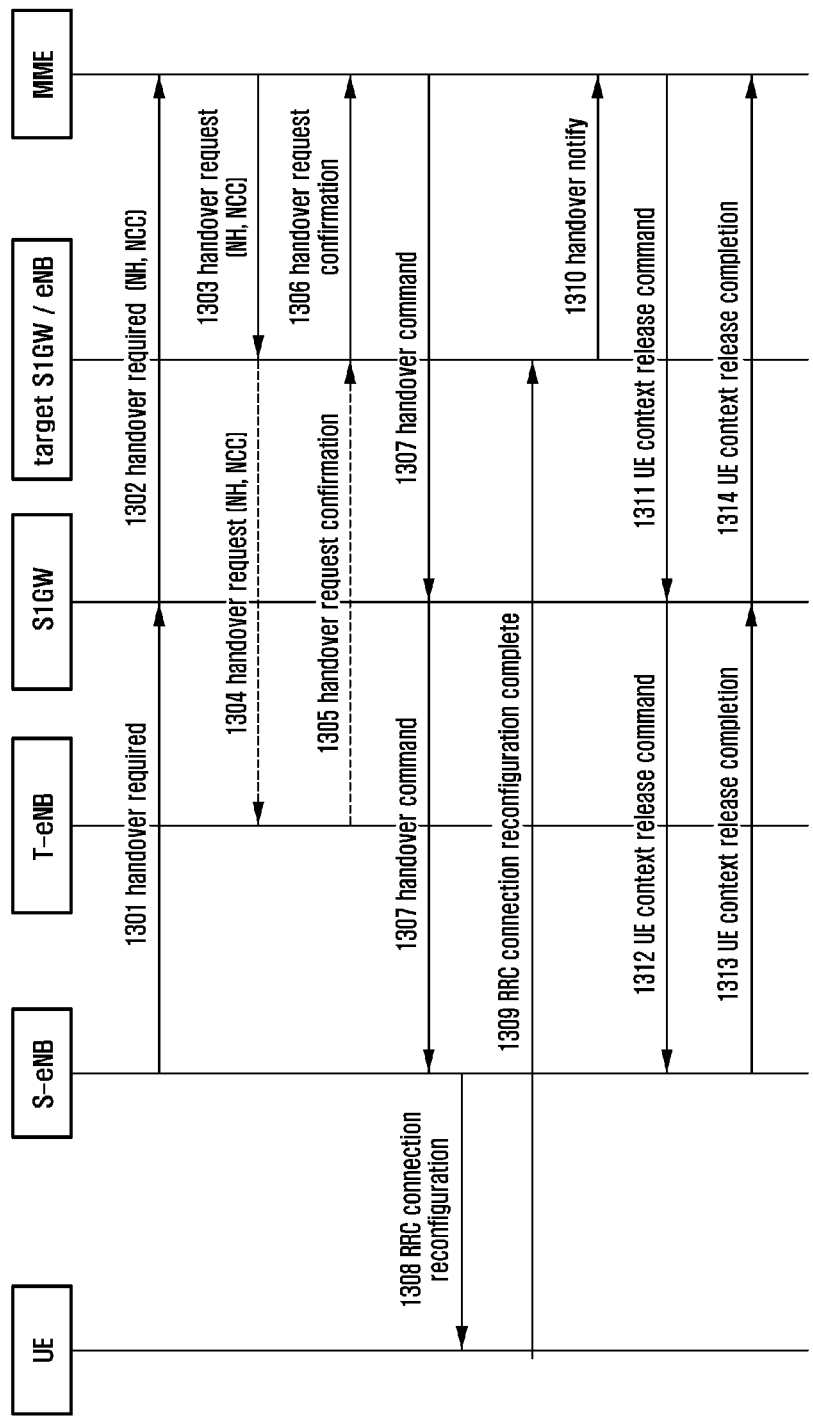

METHOD FOR RESOLVING SECURITY ISSUES USING NH AND NCC PAIRS IN MOBILE COMMUNICATION SYSTEM

CROSS-REFERENCE TO RELATED APPLICATION(S)

The present application claims priority under 35 U.S.C. §365 to International Patent Application No. PCT/KR2014/006789 filed Jul. 25, 2014, entitled "METHOD FOR RESOLVING SECURITY ISSUES USING NH AND NCC PAIRS IN MOBILE COMMUNICATION SYSTEM", and, through International Patent Application No. PCT/KR2014/006789, to Chinese Patent Application No. 201310316310.X filed Jul. 25, 2013, each of which are incorporated herein by reference into the present disclosure as if fully set forth herein.

TECHNICAL FIELD

This invention relates to wireless communications technology, and especially relates to a method for resolving security issues in a mobile communications system using NH and NCC pairs.

BACKGROUND ART

Modern mobile communications are leaning more and more towards offering the user multimedia services with high speed transmission. FIG. 1 illustrates a system architecture of System Architecture Evolution (SAE).

Amongst the system, user equipment (UE) 101 is a terminal device used to receive data. Evolved Universal Terrestrial Radio Access Network (E-UTRAN) 102 is a wireless access network, wherein, the UE includes a wireless network interface that provides access to a macro base station (eNodeB/NodeB). Mobile Management Entity (MME) 103 is responsible for managing mobile context, session context, and security information of UE. Service Gateway (SGW) 104 primarily provides user plane function. MME 103 and SGW 104 can exist within the same physical entity. Packet Data Network Gateway (PGW) 105 is responsible for billing and legitimate interception functions, and can also be located in the same physical entity as SGW 104. Policy and charging rules function entity (PCRF) 106 provides Quality of Service (QoS) policy and billing standards. Service General Packet Radio Service (GPRS) Support Node (SGSN) 108 is a network node device that provides routing for data transmission in a Universal Mobile Telecommunications Service (UMTS). Home Subscriber Service (HSS) 109 is the UE s home attribution subsystem responsible for protection on user information, including the current location of the user equipment, service node address, user security information, a packet data context of the user equipment, etc.

In release 12 (Rel-12), 3GPP raised the demand for small cell enhancement. Target scenarios of the small cell enhancement include macro cell coverage scenarios as well as scenarios without macro cell coverage, indoors and outdoors, and ideal and non-ideal backhaul enhancement, as shown in FIG. 2.

Under circumstances where there is macro cell coverage, it is proposed that carrier aggregation technology can be used between different base stations. Macro cells and small cells can work at different bands. There are many kinds of architecture for technology using different carrier aggregations between base stations, such as, radio access network RAN split based UP architecture and core network split based UP architecture. A CN split based architecture refers to that data are sent directly to Pico by the core network SGW for those bearers in pico cell, User plane data is not forwarded through macro cells. In small cell architecture, another possible type of architecture has an S1GW or small cell GW between the base station and the core network. The base station interacts with the CN through the S1GW.

In regards to a user plane architecture based on core network split, every time the second base station SeNB changes, there is signaling exchange through a core network. In a scenario without macro cell coverage, every time the switch between pico base stations occurs, it must go through a CN signaling exchange. Since the range of pico or SeNB coverage is comparatively small, this type of frequent signaling exchange with CN creates a burden on the core network.

In order to reduce the signaling exchange with the CN, it is possible to terminate the bearer switch between different base stations, e.g., the switch from SeNB1 to SeNB2, at S1GW. However, current security mechanisms do not support switch process termination at the gateway.

Following is a simple introduction to the current security mechanism.

Security levels in E-UTRAN are shown in FIG. 3.

K exists in a permanent key on an Authentication Center (AuC) on a universal integrated circuit card on a universal subscriber identity module (USIM).

CK and IK are a pair of keys created by AuC and USIM in an AKA (authentication and key agreement) process. CK and IK processes are not the same in the security context of evolved packet service (EPS) and that of legacy.

Kasme is a key created between the UE and MME after AKA concludes. UE and MME then further create keys for NAS layer encryption (KNASenc) and integrity protection (KNASint) based on Kasme.

KeNB is a key derived from ME and MME, or from ME and eNB.

NH is a key created by ME and MME for forward security.

Based on KeNB, an air interface access layer user plane encrypted key KUPenc, a control plane encrypted key KRRCenc, and a control plan integrity protection key KRRCint are further derived.

The theory of key generation at switch is shown in FIG. 4. The initial KeNB is calculated based on Kasme and NAS uplink count. When UE and eNB need to setup an initial access stratum (AS) security context, MME and UE derive KeNB and NH. KeNB and NH are derived based on Kasme. NCC has a relation to every KeNB and NH. Every KeNB has a relation to the NCC corresponding to the NH that the KeNB is derived from. At start up, KeNB is immediately derived from Kasme so KeNB is associated with a virtual NH, which is 0 in respect to NCC. During initial setup, the derived NH and NCC1 are associated. When eNB receives an initial context setup request, NCC is initialized as 0.

DISCLOSURE OF THE INVENTION

Technical Problem

During switch, the KeNB* used between UE and a target eNB is derived from the current KeNB or NH. The former is a horizontal key generating mechanism. The latter is a vertical key generation mechanism. When generating the KeNB* based on NH or KeNB, physical cell identity (PCI) and frequency (EARFCN-DL) of a target cell must be bound to the KeNB*. Clearly, in the aforementioned mechanisms, participation is required from both the core network and the UE. Thus, the current security mechanisms cannot support switch termination at S1GW.

Solution to Problem

In order to reach the aforementioned goal, this application proposes the following schemes.

A method for resolving security issues using NH and NCC pairs, including:

an MME sending a sequence including multiple NH and NCC pairs that correspond to a UE to an S1GW;

after receiving a handover message or a bearer switch message for the UE from a base station, the S1GW choosing a next unused NH and NCC pair from the sequence received from the MME, and sending the next unused NH and NCC pair to a target base station.

Preferably, the sequence is sent to the S1GW through an initial context setup request message, a UE context modification request message, a handover request message, a path switch request confirmation message, or a new message.

Preferably, the MME determines the number of base stations or cells connected to the S1GW based on configuration, and determines the number of NH and NCC pairs to be sent to the S1GW according to the number; or the MME determines the number of NH and NCC pairs to be sent to the S1GW based on the number of base stations or cells accessing the S1GW received from the S1GW; or the MME sends the sequence including NH and NCC pairs to the S1GW based on the number of NH and NCC pairs requested from the S1GW.

Preferably, when the number of unused NH and NCC pairs in the sequence received by the S1GW from the MME is less than a default threshold, the method further includes:

the S1GW requesting a sequence including new NH and NCC pairs from the MME; and the MME calculating the sequence including new NH and NCC pairs, and sending the sequence to the S1GW.

Preferably, after the MME determines a downstream node as the S1GW, the MME sends the sequence of multiple NH and NCC pairs to the S1GW.

Preferably, the method for the MME to determine the downstream node as the S1GW includes:

determining, by the MME, the downstream node as the S1GW through operations, administration, and maintenance (OAM) configuration; or based on an entity ID of the downstream node and preset corresponding relationships between entity types and entity IDs, the MME determining the downstream node as the S1GW; or the MME determining the downstream node as the S1GW based on a TA list received from the downstream node during an S1 setup process; or determining the downstream node as the S1GW based on a base station type indicator included in an S1 setup message or an initial UE message sent to the MME by the downstream node.

Preferably, after the target base station receives the next unused NH and NCC pair, the method further includes: the target base station uses the NH and NCC pair it receives to calculate a KeNB, wherein the KeNB is used as a new key for the UE and the target base station; or in regards to an X2 handover, after the target base station receives the next NH and NCC pair, the method further includes: the target base station uses the NH and NCC pair it receives to calculate a KeNB and updates a key used between the UE and the target base station as the calculated KeNB; or the target base station stores a next NH and NCC pair it receives and use it in a next handover for the UE.

Preferably, the method further includes:

when the UE is located in a small cell, if a MeNB of the UE switches a bearer of the UE on a SeNB to the MeNB or a new SeNB, the S1GW includes a next NH and NCC pair selected in a handover request confirmation message to the MeNB.

Preferably, after the S1GW sends the next NH and NCC pair to the MeNB, the method further includes:

the MeNB storing the next NH and NCC pair that it receives for use in a next switch for the UE, and deleting other NH and NCC pairs already exist; or the MeNB using the next NH and NCC pair it receives to calculate a KeNB used between the MeNB or new SeNB and the UE, wherein the MeNB or new SeNB uses the KeNB and/or NCC that was calculated.

Preferably, after the S1GW sends the next NH and NCC pair to the MeNB, the method further includes:

if the MeNB of the UE switches over the bearer of the UE from the SeNB to a new SeNB, the MeNB sending the next NH and NCC pair that it receives to the new SeNB, wherein the new SeNB uses the NH and NCC pair it receives to calculate a KeNB used between itself and the UE.

Preferably, when the UE is handed over to be within a jurisdiction of a target S1GW, the MME includes the NH and NCC pair to be used within a target cell and the sequence formed by the multiple NH and NCC pairs in a handover request message or a path switch request confirmation message to be sent to the target S1GW;

wherein a first NCC value in the multiple NH and NCC pairs and an NCC value used by the target cell are consecutive.

Advantageous Effects of Invention

This invention provides a method for resolving security issues, which can enable part of bearer switch of a UE or the UE switch terminated at S1GW or HeNB GW and reduce impact on the core network and saving system resources.

As seen in the technical schemes outlined above, in this application, MME will send a sequence including multiple NH and NCC pairs calculated for a UE to S1GW. When S1GW receives a handover message or bearer switch message from a base station for the UE, the S1GW selects a next NH and NCC pair from the sequence received from MME and sends it to the base station. In this way, during the process of UE handover or UE bearer switch, NH and NCC pairs can be issued by S1GW and sent to the base station without requiring participation from the MME entity. Thus, the partial bearer switch of the UE or the UE handover can be terminated at S1GW or HeNB GW, thereby reducing the impact on the core network and saving system resources, ensuring security mechanisms to support a switch terminated at S1GW or HeNB GW.

BRIEF DESCRIPTION OF DRAWINGS

FIG. 1 shows a currently existing SAE system architecture.

FIG. 2 shows the deployment scenario for small cell enhancement.

FIG. 3 shows security levels in E-UTRAN.

FIG. 4 shows the key generation theory during switch.

FIG. 5 shows a small cell architecture.

FIG. 6 shows a flow chart of the method of using NH and NCC pairs to resolve security issues in the present invention.

FIG. 7 shows a process of S1GW retrieving the NH and NCC pairs to resolve security issues in accordance with the first embodiment of this invention.

FIG. 8 shows a process of S1GW retrieving the NH and NCC pairs to resolve security issues in accordance with the second embodiment of this invention.

FIG. 9 shows a process of S1GW retrieving the NH and NCC pairs to resolve security issues in accordance with the third embodiment of this invention.

FIG. 10 shows a switch termination process at S1GW to resolve security issues in accordance with the first embodiment of this invention.

FIG. 11 shows a switch termination process at S1GW to resolve security issues in accordance with the second embodiment of this invention.

FIG. 12 shows a switch termination process at S1GW to resolve security issues in accordance with the third embodiment of this invention.

FIG. 13 shows a first embodiment of how to guarantee the work of a key link when a UE moves out of S1GW to another S1GW or to another macro base station.

MODE FOR THE INVENTION

In order to more clearly explain the object, techniques, and advantages of the present application, it is described below in detail along with the accompanying drawings.

FIG. 5 shows a small cell architecture. The base station connects to the core network through S1GW. The S1GW can only have functions on the control plane, or may have functions on both the control plane and the user plane. A base station (eNB) can be a macro base station, a pico base station, or a HeNB. When the base station is HeNB, the S1GW can be HeNB GW defined in the current standard.

FIG. 6 shows a flow chart of the method of using NH and NCC pairs to resolve security issues in the present invention. As shown in FIG. 6, the method includes the following steps.

At Step 601, an MME sends a string of (NH, NCC) to S1GW.

MME can send a string of NH and NCC pairs to S1GW through such as an initial context request message, a UE context modification message, a handover request message, or a path switch request confirmation message, at the time of UE initial access at S1GW.

Specifically, the number of NH and NCC pairs being sent in the message can be determined by the following methods.

The MME can know the number of base stations or small cells accessing S1GW based on configuration and determine how many NH and NCC pairs to send.

Or, S1GW can also send its base station or small cell access number to MME.

Or, S1GW can first send the number of NH and NCC pairs it needs to MME, and MME can then send the corresponding number of NH and NCC pairs to S1GW according to S1GW s request. Herein, S1GW can send to the S1GW the accessed base station or cell number or the number of NH and NCC pairs needed by S1GW to MME through an initial UE message, a S1 setup request, or a new message.

At Step 602, when S1GW receives a message related to UE handover or UE bearer switch from a base station, for example, a path switch request, an ERAB switch request, or a handover required, and S1GW needs to send a new NH and NCC pair, the S1GW chooses a next NH and NCC pair from the string of (NH, NCC) pairs it received in step 601, and sends it to a base station. For the UE handover, it is sent to the target base station. For the SeNB change, it is sent to the MeNB.

For example, S1GW receives from MME 5 NH and NCC pairs to for the UE. The first pair S1GW sends to the base station is the first one among the five pairs. The second time it needs to send a pair, it will send the second pair of the five, and so forth. This ensures that the NH and NCC pairs used at the UE and at the network side are the same.

Needing further explanation is when the unused NH and NCC pairs among the NH and NCC pairs received from the MME by the S1GW are below a certain threshold, for example, when the NH and NCC pairs received are nearly all used up or there are not enough to use, the S1GW can send a message to the MME requesting new NH and NCC pairs. The MME calculates a new string of NH and NCC pairs and sends them to the S1GW. The MME must save the NH and NCC pairs it sends to the S1GW. In this way, the MME knows which NCC to start from and based on which NH it calculates the next time it makes the calculation.

The following describes the specific implementation of the method in the present application through detailed embodiments.

FIG. 7 shows a process of S1GW receiving NH and NCC pairs when resolving security issues according to the first embodiment of the present invention. Here, detailed explanations of steps that do not relate to the present invention have been omitted. The eNB mentioned here could be a macro base station, pico base station, HeNB, etc. If the base station is HeNB, then the S1GW can be HeNB GW. The following is a detailed description of the embodiment, which includes following steps.

At Step 701, the UE sends a non-access stratum (NAS) message, such as an Attach or a service request, to an eNB.

At Step 702, the eNB sends an NAS message to the S1GW through an S1AP (S1 Access Protocol) message initial UE message. The S1GW sends the S1AP message initial UE message to the MME.

At Step 703, alternatively, an authentication/security process is executed. Execution of the security process is the same as in the current technology (refer to TS23.401) and has not been addressed here with a detailed technological description.

At Step 704, the MME sends an initial context setup request message to S1GW. The message includes a sequence including multiple NH and NCC pairs and a KeNB.

Herein, as mentioned before, specifically, the number of NH and NCC pairs being sent in the message can be determined by the following methods.

The MME can know the number of base stations or cells accessing S1GW based on configuration, in order to determine how many NH and NCC pairs to send to S1GW.

Or, the S1GW can send the number of base stations or cells accessing it to MME. Or, the S1GW can send the number of NH and NCC pairs it needs to MME and MME sends the corresponding number of NH and NCC pairs to S1GW. The S1GW can send the message to MME through an initial UE message, an S1 setup request, or a new message.

When S1GW needs more NH and NCC pairs, S1GW can also send a request to MME and MME sends the new NH and NCC pairs to S1GW.

Furthermore, in this step, whether multiple NH and NCC pairs are carried may be decided according to preset conditions. Only when the downstream node is S1GW can MME include multiple NH and NCC pairs in the initial context setup request message. The MME can determine the downstream node as S1GW by the following methods.

In Method 1, the MME recognizes the downstream node to be S1GW through the operation and maintenance (OAM) configuration.

In Method 2, the MME can identify different entity types based on the entity identity code of the downstream node (such as an eNB identity, a HeNB identity, or an S1GW identity). For example, the identity of eNB begins with 00, the identity of HeNB begins with 01, and the identity of S1GW starts from 10.

In Method 3, during the S1 setup process, the MME receives an S1 setup request message including a supported TA list from the downstream node. The S1GW can be made to support specific TA lists. MME can recognize the downstream node as S1GW based on a specific TA list.

In Method 4, during the S1 setup process, the S1 set up message sent to the MME by the S1GW includes a base station indicator that indicates the downstream node to be S1GW. The indicator can also be used to indicate the downstream node to be HeNB, a macro base station, or a pico base station.

In Method 5, the initial UE message sent to MME from S1GW includes a base station type indicator that indicates the downstream node to be S1GW. The indicator can also be used to indicate the downstream node to be HeNB, a macro base station, or a pico base station.

The method by which the MME determines the downstream node to be S1GW can be any of the above-mentioned methods, but is not limited to these methods. Other methods of implementation can be applied without affecting the main contents of the invention.

At Step 705, the S1GW sends the initial context setup request message to the base station, which includes the KeNB received from the MME.

At Step 706, the eNB sets up a radio bearer between itself and the UE.

At Step 707, the eNB sends an initial context setup response message to the S1GW.

At Step 708, the S1GW sends the initial context setup response message to the MME.

At this point, the process of this embodiment is concluded. Using the aforementioned process, multiple NH and NCC pairs can be acquired at a S1GW when a UE initial access to the S1GW. The NH and NCC pars can be used in the follow-up for supporting switch terminated at the S1GW for the UE.

FIG. 8 shows a process of S1GW obtaining NH and NCC pairs when resolving security issues with reference to the second embodiment of the present invention. Here, detailed explanations of steps that do not relate to the present invention have been omitted. The eNB here can be a macro base station, a pico base station, a HeNB, etc. If the base station is HeNB, the S1GW can be HeNB GW. The following is a detailed explanation of the embodiment, which includes:

At Step 801, a re-authentication process is carried out between the Network and UE.

At Step 802, an MME sends a UE context modification request message to an S1GW. The message includes a sequence made up of multiple NH and NCC pairs. The message may also include an updated KeNB.

The MME can determine how many NH and NCC pairs to send to the S1GW based on the base station or cell number accessing the S1GW according to the configuration.

The MME can also send the corresponding number of NH and NCC pairs to the S1GW because the S1GW sends either the number of base stations or cells accessing it or the number of NH and NCC pairs it needs to the MME. The S1GW can send the information to the MME through an initial UE message or an S1 setup request.

When the S1GW needs more NH and NCC pairs, the S1GW can also send a request message to the MME, and the MME will send new NH and NCC pairs to the S1GW.

The MME may only include multiple NH and NCC pairs into an initial context setup request message when the downstream node is the S1GW. The method by which the MME determines the downstream node to be S1GW is identical to that in step 704 and will not be addressed again here.

The S1GW saves the new NH and NCC pairs it receives and deletes previous NH and NCC pairs.

At Step 803, the S1GW sends a UE context modification request message to eNB. The message includes a new KeNB.

At Step 804, an eNB sends a UE context modification response message to the S1GW.

At Step 805, the S1GW sends a UE modification response message to the MME.

At this point, the process of this embodiment is concluded. Using the aforementioned process, after updating the key between the network and the UE, the multiple NH and NCC pairs saved in the S1GW can also be updated and used for supporting follow-up switch terminated at the S1GW.

FIG. 9 shows the third embodiment of the present invention by which the S1GW acquires NH and NCC pairs to resolve security issues. Here, detailed explanations of steps that do not relate to the present invention have been omitted. The eNB here can be a macro base station, pico base station, or HeNB, etc. If the base station is HeNB, then the S1GW can be HeNB GW. In this embodiment, the source eNB (S-eNB) directly connects to the MME, the target eNB (T-eNB) connects to the MME through the S1GW, which is to say the UE connects, through handover, to a base station which accesses the MME through the S1GW. The following is a detailed description of the embodiment, which includes the steps:

At Step 901, a source eNB sends a handover request message to a target eNB.

At Step 902, the target eNB sends a handover request confirmation message to the source eNB.

At Step 903, the source eNB sends a RRC reconfiguration message to the UE.

At Step 904, the UE sends a RRC reconfiguration complete message to the target eNB.

At Step 905, the target eNB sends a path switch request message to the S1GW.

At Step 906, the S1GW sends a path switch request message to the MME.

At Step 907, the MME sends a bearer modification request message to a SGW/PGW.

At Step 908, the SGW/PGW sends a bearer modification response message to the MME.

At Step 909, the MME sends a path switch request confirmation to the target S1GW. The message includes a NH and NCC that will be used in the new cell as well as a new string of NH and NCC.

Specifically, for the synchronized update of NH and NCC in the network and the UE after handover, NH and NCC pair A to be used in the new cell may be included in a path handover request confirmation message. Meanwhile, in order to guarantee that security mechanisms can support the switch terminated at S1GW after the UE switches over to the S1GW, the path switch request confirmation message may also include sequence B including a plurality of NH and NCC pairs corresponding to the UE calculated by the MME. The S1GW uses these NH and NCC pairs when terminating switch. How it is specifically used will be explained in the following embodiments. Herein, NH and NCC pair A and the first NH and NCC pair in sequence B are consecutive so as to ensure that the NCC value in the UE and network side are always maintained consistent.

At Step 910, the S1GW sends a path switch request confirmation message to the target eNB. The message includes the next NH and NCC pair received from the MME, namely, NH and NCC pair A that will be used by the new cell mentioned above. Requiring further attention is the fact that this is one pair of NH and NCC rather than a sequence of multiple NH and NCC pairs. A sequence of multiple NH and NCC pairs is saved at S1GW and used when switch is terminated at S1GW.

The target eNB uses the NH and NCC pair in the path switch request confirmation message, the target cell PCI, and the target cell frequency EARFCN-D to calculate the KeNB used between UE and the target eNB. The KeNB is calculated using the current technology, which will not be described in detail here.

At Step 911, the target eNB sends a resource release message to the source eNB.

At this point, the process of this embodiment is complete. Through the aforementioned process, multiple NH and NCC pairs can be acquired when the UE, through switch, accesses a base station that connects the MME via the S1GW, and can be used for follow-up switch terminated at the S1GW.

The three aforementioned processes are all detailed processes by which S1GW acquires multiple NH and NCC pairs. The following is a description of how to use the NH and NCC pairs after multiple NH and NCC pairs are acquired.

FIG. 10 shows an embodiment of the present invention for resolving security issues by terminating the switch process at S1GW. Herein, the UE carries out S1 handover under the same S1GW. The detailed description of steps that do not pertain to the present invention has been omitted. The eNB here can be a macro base station, pico base station, HeNB, etc. If the base station is HeNB, then the S1GW can be HeNB GW. The following is a detailed description of this embodiment, included of the following steps.

At Step 1001, a source eNB sends a handover required message to the S1GW.

At Step 1002, the S1GW decides to terminate the handover process at the S1GW, and sends a handover request message to a target eNB which includes a next NH and NCC pair selected from the saved NH and NCC pairs.

How it is decided that the handover process should be terminated at S1GW is not the main point of this invention, the detailed description of which has been left out here. In this step, the NH and NCC pair is used to update the KeNB used between the UE and the target eNB.

At Step 1003, the target eNB uses the NH and NCC pair in the handover request message, the target cell PCI, and the target cell frequency EARFCN-D to calculate the KeNB used between UE and the target eNB. The KeNB is calculated using the current technology and will not be described in detail here. The target eNB associated the received NCC and the KeNB. The target eNB puts the NCC in the NH and NCC pair into the RRC Connection reconfiguration message to the UE and then deletes an older, unusable NH and NCC pair. The target eNB sends the handover request confirmation message to the S1GW.

At Step 1004, the S1GW sends a handover command message to the source eNB.

At Step 1005, the source eNB sends an RRC connection reconfiguration message to the UE.

At Step 1006, the UE sends an RRC connection reconfiguration complete message to the target eNB.

At Step 1007, the target eNB sends a handover notify message to the S1GW.

At Step 1008, the S1GW sends a UE context release command message to the source eNB.

At Step 1009, the source eNB sends a UE context release completion message to the S1GW.

At this point, the method of the process in this embodiment is complete. In using the aforementioned process, it can be ensured that the security mechanism supports switch termination at S1GW during the S1 handover process because S1GW sends the next NH and NCC pair down to the target eNB rather than requiring participation from the MME.

FIG. 11 shows the second embodiment of the present invention for resolving security issues by terminating the switch process at S1GW. Herein, UE carries out X2 handover under the same S1GW. Detailed explanations of steps that do not relate to the present invention have been omitted. The eNB mentioned here could be a macro base station, a pico base station, a HeNB, etc. If the base station is HeNB, then the S1GW can be HeNB GW. The following is a detailed description of the embodiment, which includes the steps.

The processes in steps 1101-1105 and steps 901-905 are the same, which will not be described again here.

At Step 1106, S1GW sends a path switch request confirmation message to the target eNB. The message includes a next unused NH and NCC pair.

In steps 1101-1105 mentioned before, the source eNB will send KeNB and NCC to the target eNB which is used between UE and target eNB. The target eNB sends the NCC to the UE. Therefore, in this step, after the target eNB receives the NH and NCC pair, it can save the NH and NCC pair and use it for next handover for the UE, and then delete other saved NH and NCC pairs. Or considering that the source eNB already know the security key eNB between the target eNB and UE, which may bring about a hidden security threat, in this step, after the target eNB receives the NH and NCC pair, it can also update the KeNB according to the NH and NCC pair. That is to say, after this handover is completed, the target eNB initiates the KeNB update process between itself and the UE. The target eNB uses the NH and NCC pair, the target cell PCI, and the target cell frequency EARFCN-D to calculate a new KeNB and uses it to update the KeNB between the target eNB and UE.

At Step 1107, the target eNB sends a resource release message to the source eNB.

At this point, the method of the process in this embodiment is complete. In using the aforementioned process, it can be ensured that the security mechanism supports handover termination at S1GW during the X2 handover process because S1GW sends the next NH and NCC pair to the target eNB without requiring participation from the MME.

FIG. 12 shows the third embodiment of the present invention for resolving security issues by terminating the switch process at S1GW. Herein, UE is located in a small cell, the master eNB of the UE (MeNB) is configured for transmission of control messages for the UE. The secondary eNB (SeNB) is configured for transmission of data of the UE. Naturally, the MeNB can also send data to the UE. SeNB may also send control plane information to the UE.

This invention does not limit the function of MeNB and SeNB. Here, detailed explanations of steps that do not relate to the present invention have been omitted. The eNB mentioned here could be a macro base station, pico base station, HeNB, etc. If the base station is HeNB, then the S1GW can be HeNB GW. The following is a detailed description of the embodiment, which includes the steps:

At Step 1200, the MeNB determines to switch a bearer.

For example, based on UE measurement results, the SeNB where some bearer of the UE locates can no longer be used, or the SeNB load is too high. The MeNB determines to switch the bearer to new SeNB or MeNB of the UE.

Herein, if the MeNB decides to switch the bearer to a new SeNB, then step 1201 will be carried out. If MeNB decides to switch the bearer to the MeNB of the UE, then step 1203 will be carried out directly.

At Step 1201, the MeNB sends a SeNB addition request message to the new SeNB.

At Step 1202, the new SeNB allocates resources. The new SeNB sends a SeNB addition request acknowledge message to the MeNB.

At Step 1203, the MeNB reconfigures the UE. The MeNB sends an RRC reconfiguration request message to the UE, and the UE sends an RRC reconfiguration response message to the MeNB.

At Step 1204, the MeNB sends an ERAB switch request message to the S1GW.

At Step 1205, the S1GW sends an ERAB switch request confirmation message to the MeNB. The message includes a next unused NH and NCC pair that was from the saved NH and NCC pairs.

Similar to step 1106 in FIG. 11, after the MeNB receives an NH and NCC pair, the NH and NCC pair received can be saved and used in the next switch of the UE, and then the other saved NH and NCC pairs can be deleted. Or, it can be used to update the KeNB between the MeNB or new SeNB and the UE after completion of this bearer switch.

Specifically, the method for using the NH and NCC pair for updating the KeNB after this bearer switch can be:

1) If the bearer switches to a new SeNB or the MeNB of the UE, then the MeNB can use the NH and NCC pair, the PCI of the target cell, and the frequency EARFCN-D of the target cell to calculate the KeNB used between the new SeNB or MeNB of the UE and the UE. How the KeNB is calculated is an existing technology and a detailed description of the calculation has been omitted from here. The MeNB sends the new KeNB and/or NCC to the new base station (if the new base station is the MeNB, then it does not need to be sent). The new SeNB or the MeNB of the UE associates the NCC and KeNB received. The new SeNB or MeNB of the UE puts the received NCC in the radio resource control RRC message (for example, a RRC reconfiguration message) to be sent to the UE or in a container from the new eNB to the MeNB, and then deletes the old, unusable NH and NCC pair. The RRC message can also be sent to UE by MeNB. The specifics of how an RRC message is sent to UE by MeNB or a new SeNB are not the main point of this invention. The main point in this processing method is that MeNB gets new NH and NCC pairs, calculates a new key used between the UE and the new eNB, and sends the KeNB and/or NCC to the new base station, thereby increasing security.

2) If the UE bearer switches from one SeNB to a new SeNB, MeNB can still send the new NH and NCC pair to the new SeNB after receiving it. The new SeNB uses the NH and NCC pair it receives, the PCI of the target cell and the frequency EARFCN-D of the target cell to calculate the KeNB used between the UE and the new SeNB. How the KeNB is calculated is an existing technology and detailed descriptions of the calculation have been omitted from here. The new SeNB associates the received NCC and the KeNB. The new SeNB puts the NCC received in the NH and NCC pair into the UE radio resource control RRC message (for example, an RRC reconfiguration message) or into a container of from the new SeNB to the MeNB, and then deletes the old, unusable NH and NCC pair.

The new KeNB can also be sent from the new SeNB to the MeNB, and the MeNB sends an RRC message to the UE. The specifics of how an RRC message is sent to UE by MeNB or a new SeNB are not the main point of this invention. The main point in this processing method is that MeNB gets new NH and NCC pairs, sends them to the new SeNB, and the new SeNB calculates the new key used between the new SeNB and UE, thereby increasing security.

At this point, the process of the method in this embodiment is completed. Using the aforementioned process, while carrying out the SeNB bearer switch process in a small cell, the next NH and NCC pair is sent to the eNB by S1GW without requiring participation from the MME, thereby ensuring that the security mechanism supports the switch terminated at S1GW.

FIG. 13 is an embodiment of how to safeguard the works of a key chain when a UE moves to another S1GW or macro base station by switching out of the jurisdiction range of a S1GW. The following is a detailed description of the embodiment. Here, some optional processes and steps that do not relate to this invention have been omitted.

At Step 1301, a source eNB sends a handover required message to a S1GW.

At Step 1302, the S1GW sends a handover required message to an MME.

In this step, the message can include a next NH and NCC pair that needs to be used, which may be a next unused NH and NCC pair in the sequence saved in the S1GW. When there is no unused NH and NCC pair, the message can include the next NCC value. Or, the NH and NCC pair currently being used can be included in the message in this step, the new NH can be calculated by the MME itself based on Kasme and the received NH, the specific calculation method of which is the same as that in the current technology. Or, the message in this step can also include all of the unused NH and NCC pairs in the sequence stored at the S1GW. The MME starts using a next unused pair chosen from all of the unused NH and NCC pairs it receives.

At Step 1303, the MME sends a handover request message to the target S1GW or eNB. The message includes an NH and NCC pair to be used in the new cell.

Herein, the NH and NCC pair that will be used in the new cell in this step can be received from the source S1GW or calculated by the MME itself.

If the target base station connects to a new S1GW, the message in this step can also include a new string of NH and NCC pairs that the MME calculated for the UE to be used for follow-up switch of the UE terminated at the new S1GW. The new S1GW uses these NH and NCC pairs when terminate handover procedure. The specific description of usage is the same as in FIG. 6, FIG. 10, FIG. 11, and FIG. 12. Herein, the first NCC value that will be used in the new cell and the first NCC value in the string are consecutive in order to ensure that NH and NCC values of the UE and network side are consistent.

At Step 1304, if the UE is moved to an eNB under another S1GW, the target S1GW (the another S1GW) sends a handover request message to a target eNB. The message includes the next NH and NCC pair received from the MME. What should be noted is that this is a pair of NH and NCC and not a sequence included of multiple NH and NCC pairs. A sequence including multiple NH and NCC pairs is stored at S1GW and used when switch is terminated at S1GW.

The target eNB uses the NH and NCC pair in the handover request message, the target cell PCI, and the target cell frequency EARFCN-D to calculate the KeNB used between itself and the UE. The KeNB is calculated using the current technology and will not be described in detail here. The target HeNB correlates the received NCC and the KeNB. The target HeNB puts the NCC from the NH and NCC pair it received into the RRC connection reconfiguration message it sends to the UE, and then deletes the old, unusable NH and NCC pair.

At Step 1305, the target eNB sends a handover request confirmation message to the target S1GW.

At Step 1306, the target S1GW or eNB sends a handover request confirmation message to the MME.

At Step 1307, the MME sends a handover command message to the source S1GW.

The source S1GW sends a handover command message to the source eNB.

At Step 1308, the source eNB sends a RRC connection reconfiguration message to the UE.

At Step 1309, the UE sends a RRC connection reconfiguration complete message to the target eNB. If the UE switches to an eNB under another S1GW, the UE sends a RRC connection reconfiguration complete message to the target eNB. The target eNB sends a handover notify message to the target S1GW.

At Step 1310, the target eNB or S1GW sends a handover notify message to the MME.

At Step 1311, the MME sends a UE context release command message to the source S1GW.

At Step 1312, the source S1GW sends a UE context release command message to the source eNB.

At Step 1313, the source eNB sends a UE context release completion message to the source S1GW.

At Step 1314, the source S1GW sends a UE context release completion message to the MME.

At this point, the method of the process in this embodiment is complete. Using the aforementioned method, it can be ensured that the security mechanism supports the subsequent switch terminated at a target S1GW through the source S1GW notifying the MME of the next NH and NCC pair and through the MME sending to the target S1GW the next NH and NCC pair and a string of NH and NCC pairs used for follow-up switch terminated at the target S1GW when the UE moves out of the jurisdiction area of the source S1GW.

It can be seen that by the specific implementation of this application, the method for resolving security issues in this application can support switch terminated at S1GW, ensure that participation from an MME is not necessary in the switch process while still bringing about security authentication between UEs and base stations after switch, which reduces impact on the core network as well as saving system resources.

The preferred embodiments of the present invention described above are not intended to limit the invention. Any changes, equivalent substitutes, improvements, etc., made within the spirit and principles of the present invention, should be included in the scope of protection of the present invention.

The invention claimed is:

1. A method by a node for resolving security issues using next hop (NH) and next hop chaining counter (NCC) pairs, the method comprising:
receiving from a mobile management entity (MME), a message including a sequence including multiple NH and NCC pairs that correspond to a user equipment (UE);
determining a next unused NH and NCC pair from the sequence received from the MME after receiving a handover message or a bearer switch message for the UE from a first base station; and
transmitting the next unused NH and NCC pair to a second base station,
wherein a number of the multiple NH and NCC pairs is determined by the MME based on a number of base stations or cells connected to the node.

2. The method according to claim 1, wherein the sequence is transmitted to the node through at least one of an initial context setup request message, a UE context modification request message, a handover request message, a path switch request confirmation message, or a new message.

3. The method according to claim 1, wherein the number of the multiple NH and NCC pairs is determined by the MME based on one of a configuration,
the number of base stations or cells accessing transmissions from the node to the MME, and
the number of NH and NCC pairs requested from the node to the MME.

4. The method according to claim 1, wherein if a number of unused NH and NCC pairs in the sequence transmitted from the MME is less than a default threshold, the method further comprises:
transmitting a request message requesting a sequence including new NH and NCC pairs to the MME; and
receiving, in response to the request message, the sequence including new NH and NCC pairs from the MME,
wherein the new NH and NCC pairs included in the sequence are calculated by the MME.

5. The method according to claim 1, wherein the message including the sequence of multiple NH and NCC pairs is received if the node is determined as a downstream node by the MME.

6. The method according to claim 5, wherein the node is determined as the downstream node based on one of the following:
operations, administration, and maintenance (OAM) configuration;
an entity ID of the downstream node and preset corresponding relationships between entity types and entity IDs;
a tracking area (TA) list received from the downstream node during an S1 setup process; and
a base station type indicator included in an S1 setup message or an initial UE message transmitted to the MME by the downstream node.

7. The method according to claim 1, wherein, if the second base station is a target base station, one of the following applies:
the next unused NH and NCC pair is used by the target base station to calculate a KeNB, the KeNB being used as a new key for the UE and the target base station;
in regards to an X2 handover, the next unused NH and NCC pair is used by the target base station to calculate a KeNB and is updated to a key used between the UE and the target base station; and the next unused NH and NCC pair is stored by the target base station for a next handover for the UE.

8. The method according to claim 1:
wherein the first base station is a master base station and the second base station is a secondary base station when the UE is located in a small cell, and
wherein the next unused NH and NCC pair is included in a handover request confirmation message transmitted from the node to the master base station if the master base station of the UE switches a bearer of the UE on the secondary base station to the master base station or a new secondary base station.

9. The method according to claim 8, wherein one of the following applies:
the next unused NH and NCC pair is stored by the master base station to use in a next switch for the UE, and is deleted by the master base station if other NH and NCC pairs already exist; and
the next unused NH and NCC pair is used by the master base station to calculate a KeNB used between the master base station or the new secondary base station and the UE, wherein at least one of a KeNB or the NCC that was calculated is used by the master base station or the new secondary base station.

10. The method according to claim 8:
wherein the next unused NH and NCC pair received from the node is transmitted from the master base station to the new secondary base station if the master base station of the UE switches over the bearer of the UE from the secondary base station to a new secondary base station, and
wherein the next unused NH and NCC pair transmitted from the master base station to the new secondary base station is used by the new secondary base station to calculate a KeNB used between the new secondary base station and the UE.

11. The method according to claim 1, wherein if the UE is handed over to a target node:
the sequence formed by the multiple NH and NCC pairs and an NH and NCC pair to be used within a target cell are included in a handover request message or a path switch request confirmation message transmitted from the node to the MME, and a first NCC value in the multiple NH and NCC pairs and an NCC value used by the target cell are consecutive.

12. A node for resolving security issues using next hop (NH) and next hop chaining counter (NCC) pairs, the node comprising:
a transceiver configured to receive from a mobile management entity (MME) a message including a sequence, the sequence including multiple NH and NCC pairs that correspond to a user equipment (UE); and
a processor configured to determine a next unused NH and NCC pair from the sequence received from the MME after receiving a handover message or a bearer switch message for the UE from a first base station, and to control the transceiver to transmit the next unused NH and NC pair to a second base station,
wherein a number of the multiple NH and NCC pairs is determined by the MME based on a number of base stations or cells connected to the node.

13. The node according to claim 12, wherein the sequence is transmitted to the node through at least one of an initial context setup request message, a UE context modification request message, a handover request message, a path switch request confirmation message, or a new message.

14. The node according to claim 12, wherein the number of the multiple NH and NCC pairs is determined by the MME based on one of:
a configuration, the number of base stations or cells accessing the node transmitted from the node to the MME, and the number of NH and NCC pairs requested from the node to the MME.

15. The node according to claim 12, wherein if a number of unused NH and NCC pairs in the sequence from the MME is less than a default threshold, the processor is further configured to:
transmit a request message requesting a sequence including new NH and NCC pairs to the MME; and
receive, in response to the request message, the sequence including new NH and NCC pairs from the MME,
wherein the new NH and NCC pairs included in the sequence are calculated by the MME.

16. The node according to claim 12, wherein the message including the sequence of multiple NH and NCC pairs is received if the node is determined as a downstream node by the MME.

17. The node according to claim 16, wherein the node is determined as the downstream node based on one of:
operations, administration, and maintenance (OAM) configuration;
an entity ID of the downstream node and preset corresponding relationships between entity types and entity IDs;
a tracking area (TA) list received from the downstream node during an S1 setup process; and
a base station type indicator included in an S1 setup message or an initial UE message transmitted to the MME by the downstream node.

18. The node according to claim 12, wherein the processor is further configured to:
select a next NH and NCC pair; and
control the transceiver to transmit a handover request confirmation message including the selected next NH and NCC pair to a master base station when the UE is located in a small cell, if the master base station of the UE switches a bearer of the UE on a secondary base station to the master base station or a new secondary base station.

19. The node according to claim 18, wherein, after the node transmits the next NH and NCC pair to the master base station:
the next unused NH and NCC pair for use in a next switch for the UE is stored by the master base station, and deleted by the master base station if other NH and NCC pairs already exist; and
the next unused NH and NCC pair is used by the master base station to calculate a KeNB used between the master base station or new secondary base station and the UE, wherein at least one of the KeNB or the NCC that was calculated being used by the master base station or the new secondary base station.

20. The node according to claim 18, wherein one of the following apply:
the next unused NH and NCC pair is transmitted from the master base station to the new secondary base station if the master base station of the UE switches over the bearer of the UE from the secondary base station to the new secondary base station, and the next unused NH and NCC pair is used by the secondary base station to calculate a KeNB used between the secondary base station and the UE.

* * * * *